Oct. 21, 1930.  F. E. JONES  1,779,239

MECHANISM FOR PRODUCING REENFORCED HOSIERY

Original Filed June 18, 1923   6 Sheets-Sheet 1

Inventor:
Frank E. Jones,

Oct. 21, 1930.  F. E. JONES  1,779,239
MECHANISM FOR PRODUCING REENFORCED HOSIERY
Original Filed June 18, 1923   6 Sheets-Sheet 6

Inventor:
Frank E. Jones.

Patented Oct. 21, 1930

1,779,239

UNITED STATES PATENT OFFICE

FRANK E. JONES, OF PAWTUCKET, RHODE ISLAND, ASSIGNOR TO HEMPHILL COMPANY, OF CENTRAL FALLS, RHODE ISLAND, A CORPORATION OF MASSACHUSETTS

MECHANISM FOR PRODUCING REENFORCED HOSIERY

Original application filed June 18, 1923, Serial No. 647,518. Divided and this application filed March 8, 1929. Serial No. 345,483.

This application is a division of my copending application, Serial No. 647,518, filed June 18, 1923, now Patent #1,718,932.

In order that the principle of the invention may be readily understood, I have disclosed a single embodiment thereof in the accompanying drawings, wherein—

Fig. 7 is a horizontal section upon the line 7—7 of Fig. 6;

Figures 1, 2, 3, 4, 5:
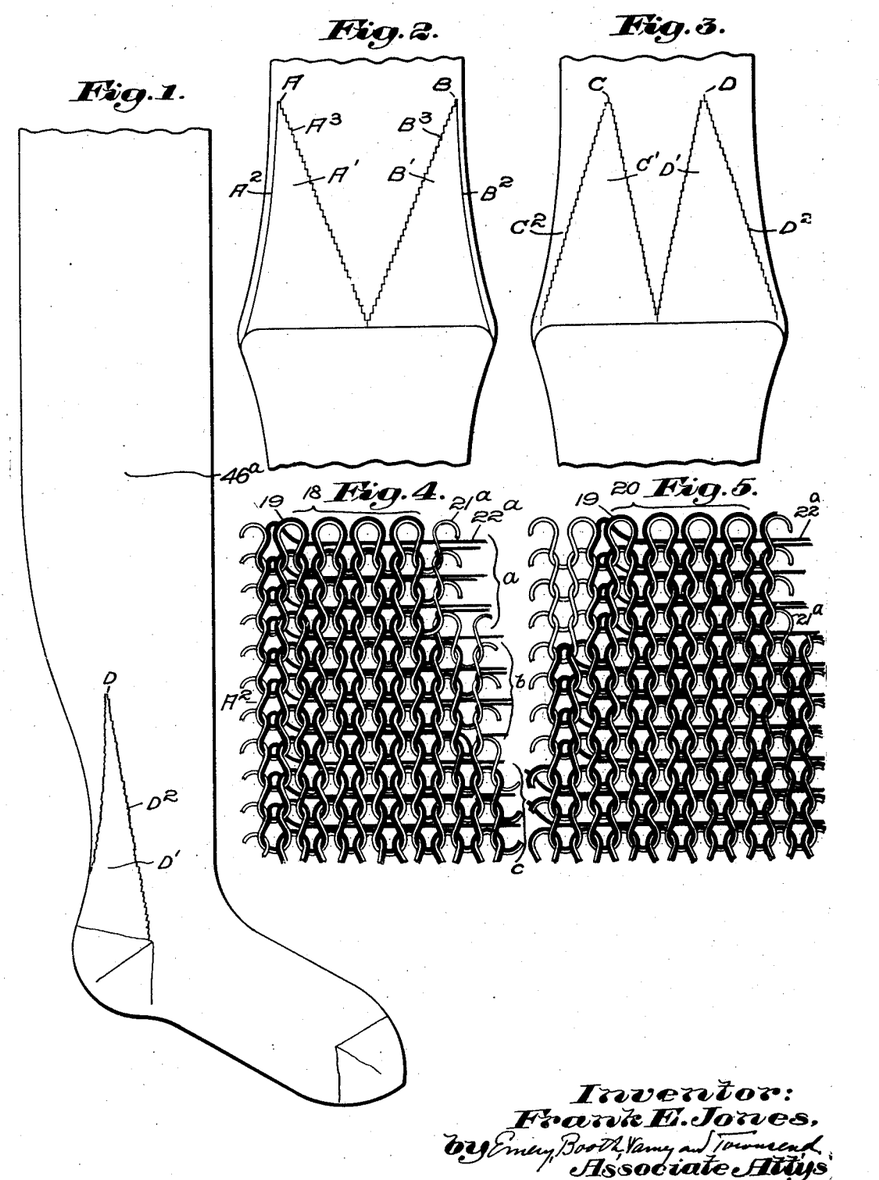
Fig. 1 is a side elevation of a circular knit or so-called seamless stocking constructed in accordance with my invention.
Fig. 2 is a detail in rear elevation of the structure of the heel at the high splice area according to one disclosure of my invention.
Fig. 3 is a similar view of a slightly modified form of my invention.
Fig. 4 is an enlarged detail showing the loops of the fabric in the first few partial courses of one of the reenforcing areas shown in Fig. 2.
Fig. 5 is a view similar to Fig. 4 but representing the loops of the fabric of the first few partial courses of one of the reenforcing areas of Fig. 3.
Figure 2:
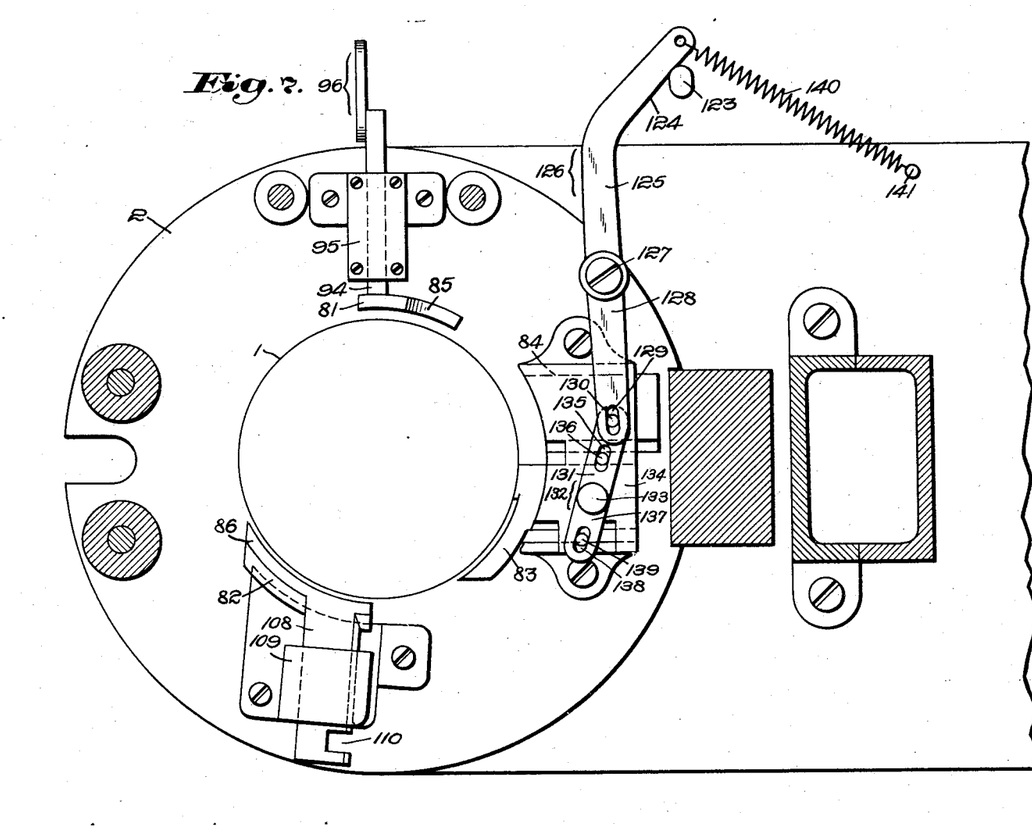

In my parent application Serial No. 647,518, which itself is an improvement upon the construction shown in the patent to Robert H. Lawson, No. 1,459,157, there is disclosed means for making a tapered high splice with accurate edges at both the ingoing and outcoming sides or edges thereof. In Figs. 23, 24 and elsewhere of said Lawson Patent No. 1,459,157, there is shown the contour of the tapered high splice reenforcement as triangular. In said parent application I described in detail the making of a high splice in the form of a capital letter M, wherein the outer edges of the two parts of the M-like area might be either along parallel lines or diverging from each other. In this application, I show the arrangement of jacks used in knitting a high splice area of the shape of a capital letter M, and claim the same.

It will be unnecessary to describe at length all the parts of the mechanism since a number of them are or may be similar to the corresponding parts shown in the said Lawson patent No. 1,459,157.

Generally speaking the machine is a circular knitting machine of the Banner type, the needle cylinder having means to rotate the same and to reciprocate the same for heel and toe work.

Figure 6:
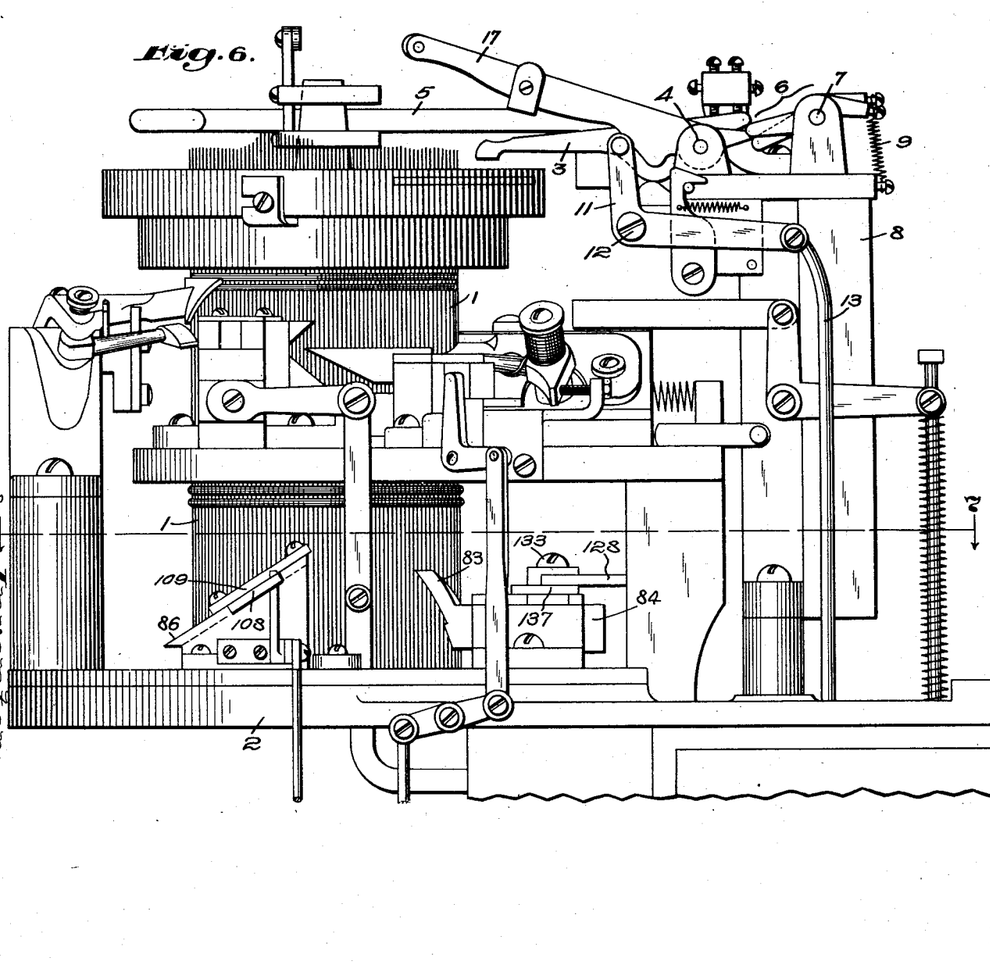
Fig. 6 is a front elevation of the upper portion of a circular knitting machine constructed in accordance with my invention.

Referring first to Fig. 6 of the drawings, the needle cylinder is represented at 1, it being mounted upon a suitable table 2 constituting a part of the framing of the machine.

A plurality of yarn feeding elements is provided at the usual position characteristic of the Banner machine, and one of said feeding elements is indicated at 3 in Fig. 6 in its feeding position. Desirably as many as four or five yarn guides may be mounted at the same place to introduce the yarns as called for by the controlling cam, as, for example, for the leg, the heel and toe, and the foot, etc. All of said yarn guides are pivoted at 4 upon a partial ring 5 itself suitably pivoted so that it may be swung up out of action. Said ring 5 is of the type usually employed in the Banner machine equipped with spring beard needles, but my invention is applicable to latch needles.

Each of the yarn guides is adapted to be pressed or urged into action by one of a suitable series of levers indicated at 6 pivoted at 7 upon a standard 8, coiled springs 9 being provided tending to move each of said levers into operative position. Such movement of said levers into operative position is, however, at times overcome by a series of levers, one for each of the yarn guides. I have not indicated said series of levers, but I have indicated at 11 a lever for operating a certain one of a group of yarn guides, it being pivoted at 12 upon the standard 8 and to the other end of said lever there is connected a link 13 extending to the proper lever riding upon a cam on the cam shaft. Assuming that there are four or five levers in the group referred to, it is evident that the yarn guides are permitted to act at usual times so as, for example, to supply a yarn or thread for the leg of the stocking, another for the heel, another for the foot, etc.

Each of the said yarn guides supplies its yarn or thread in proximity to the knitting point, and each yarn so taken is knitted upon all the needles in action. In addition to the usual yarn guides of the said group, I provide another and preferably longer yarn guide indicated at 17. Said yarn guide 17 is shown in Fig. 6 as positioned somewhat higher than the lowermost or feeding position of each of the other yarn guides of the said group. Desirably said yarn guides 17 is formed as a lever mounted upon the pivotal support 4, and is shown as longer than the outer guides of the said group of yarn guides, so that it may present its yarn (which is the reenforcing yarn) to the selected needles at a point somewhat removed from the knitting point, the construction and operation of parts being such that in the form of my invention contemplated in Fig. 6 the said reenforcing yarn is received under the beards of the needles, but is not knitted until said yarns approach or arrive at the knitting point where they receive the regular yarn. Thus, at the knitting point the regular yarn and reenforcing yarn are both knitted into the fabric.

The reenforcing yarn guide 17 in the disclosed embodiment of the invention has two positions only, namely, the feeding or lowering position and the inactive or elevated position shown in full lines in Fig. 6. The active or feeding position is occupied during all circular work whether or not the reenforcing yarn is to be taken by the needles or any of them, and the inactive position is taken only during the knitting of the heel and toe. The said two positions of the reenforcing yarn guide 17 are given by the proper cam on the cam shaft which in usual practice supports the main pattern drum and other parts.

It is possible to retain the reenforcing yarn guide 17 in its down position during all circular work whether or not the fabric is being reenforced, for the reason that the needles which take the reenforcing yarn at said guide 17 rise above the general level of the needles to receive said reenforcing yarn as indicated in Fig. 6. The active or feeding position of said reenforcing yarn guide 17 is therefore somewhat higher than the feeding position of the regular yarn guide, as is evident from the position of the yarn guide 3 in Fig. 6.

In order to provide the double pointed high splice reenforcement herein disclosed and the mechanism for effecting which is herein claimed, an increasing number of needles are in successive courses at two separated points presented to the fixed position reenforcing yarn guide 17. In order to present the variable or increasing number of needles to said yarn guide 17 I provide for each of the needles that is at any time to take the reenforcing yarn, an instrumentality in the nature of a jack, such jack being of the general type disclosed in said Lawson patent and therefore distinct from but adapted to move independent of its needle, and also adapted to move with its needle so as to move the latter; that is, in this embodiment of the invention, to elevate the needle in its groove so that it will take the reenforcing yarn. Said jacks are desirably placed in the needle grooves of the desired number of needles below the latter. Preferably said jacks are positioned in a semi-circle beneath all the short butt needles, or in other words beneath all the heel needles. Thus only the instep needles are unprovided with jacks.

As broadly disclosed in said Lawson patent the jacks are provided with interengaging formations, most of the jacks being provided with lateral projections for effecting interengagement between neighboring jacks. It will be unnecessary for me to describe at length the action of the interengaging jacks, inasmuch as the same is broadly disclosed in said Lawson patent.

Figure 16:
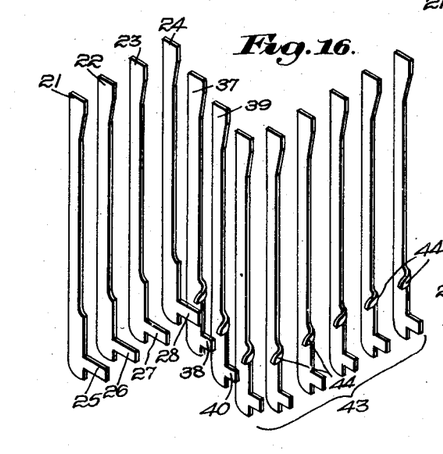
Figs. 16 and 17 are respectively a perspective view and a front elevation of the interengaging jacks for the needles employed in making the shape of reenforcement shown in Fig. 2.
Figure 17:
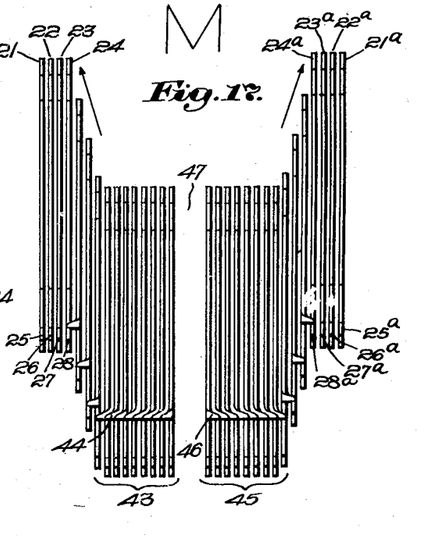

In order to make the double pointed tapered high splice (namely, one having the shape of a capital letter M, either of the form shown in Fig. 2 or of the form shown in Fig. 3), each point of the high splice is commenced upon a minimum number of needles which is preferably four, as indicated by the four wales 18 in Fig. 4 that have received the reenforcing or high splice thread 19 in the first course of said high splice. It is to be understood that, referring to Fig. 2, four needles receive the reenforcing yarn 19 at the point A and four other needles receive the yarn at the point B, the said yarn being floated from the pointed reenforcing area A' to the pointed reenforcing area B' in each course. In such case, I provide, as indicated in Figs. 16 and 17, two sets of four jacks each, indicated at 21, 22, 23, 24 and 21$^a$, 22$^a$, 23$^a$, 24$^a$. The said two sets of four jacks are provided with butts 25, 26, 27, 28 and 25$^a$, 26$^a$, 27$^a$, 28$^a$, but are not provided with lateral projections or formations for interengagement with any other jacks.

Referring to Figs. 2 to 5 inclusive, it will be evident that in Figs. 2 and 4 the outer legs or lines of the letter M are vertical rather than inclined, as is shown at A$^2$, B$^2$. The apparent slope of the lines A$^2$, B$^2$ in Fig. 2 is not existent in the knitted fabric excepting as the same is stretched. That the leg or line A² is vertical is evidenced from the left hand edge of Fig. 4. In the case of the formation shown in Figs. 3 and 5, however, the reenforcement is commenced at C and D, preferably upon four wales as indicated at 20 in Fig. 5 where the reenforcing yarn 19 is shown as taken by four needles, and in making two pointed areas C', D', the outer lines or legs C², D² are inclined instead of being vertical. That is to say, in Fig. 3, two substantially isosceles triangles C', D' are formed, whereas in Fig. 2 two substantially right angle triangles A', B' are formed. In making the reenforcement in Fig. 2, there is therefore no successive increase in the number of needles taking the reenforcing thread along one edge of the reenforcement, but only at the two inner edges A³, B³, Fig. 2, and as indicated in Fig. 4. In making the reenforcement of the shapes shown in Figs. 3 and 5, however, there is an increase in successive courses or successive sets of courses of the number of needles taking the reenforcing yarn at both the inner and outer edges of the two tapered reenforcements C', D'.

Referring again to Figs. 16 and 17, wherein is indicated the construction and arrangement of jacks for making the double pointed reenforcement of the shape of the capital letter M with the outer legs or lines thereof vertical, the outermost right hand jack 24 constitutes a key jack but in the form of the invention shown in Figs. 16 and 17, the left hand outermost jack 21 is not a key jack because I do not successively elevate an increasing number of jacks or needles at the vertical lines or legs of the M. Any desired number of jacks may be provided in the series here shown as the four jacks 21, 22, 23, 24.

The butts 25, 26, 27, 28 of the four central jacks are long butts, said jacks in this particular having the same characteristics as the key jack or jacks of the said Lawson patent excepting as just stated. In that form of the invention shown in Figs. 16 and 17, the jack 21 at the left is the last jack of the series at that side, and the jack 21ª at the right is the last jack at that side of the series, it being understood that the vertical limbs of the letter M having that formation are formed upon said jacks 21, 21ª, as will be understood from an inspection of Figs. 2 and 4. At the right of the key jack 24 is positioned a jack 37 having a butt 38 and to the right of the jack 37 is positioned a jack 39 having a butt 40, and under each of the reenforcing needles to the right of the jack 39 is positioned a jack desirably identical with the jacks 37 and 39, and this arrangement is continued so far as is necessary to make the right angled tapered reenforcement A' of Fig. 2, the butts of the jacks 33, 35, 37, 39, 40, being similar in this respect to the disclosure in the said Lawson patent.

The jacks 37, 39 are provided with lateral projections 43, 44 adapted to be engaged respectively by butts 28, 38 of the jacks 24, 37, said lateral projections being desirably formed by bending an ear or enlargement into a position at nearly right angles to a face of its jack and in such manner as to provide a horizontal or flat under surface 45 upon each of said lateral formations.

Assuming for purposes of description that the tapered high splice of Fig. 2 is commenced upon two sets of four needles each as indicated in Fig. 4, it will be clear that upon the first course whereon the reenforcing thread 19 is taken by the two groups of four needles each, four loops are formed at both of said points from both the main yarn 21ª and the reenforcing yarn 19 and the said reenforcing yarn is floated from the area A', to the area B', or vice versa, in each course, and from the second of said areas said reenforcing yarn 19 at the outgoing edge thereof is floated around to the incoming edge of the first of said areas, and so on in succeeding courses.

Within the scope of the invention, the angle of taper at tapering edges may be varied; for example, I may upon two successive courses supply the reenforcing yarn to the same number of needles as, for example, four in each set, and upon the third course may supply said reenforcing yarn to one additional needle and repeat such operation throughout the formation of the reenforcement, or I may supply the minimum number of needles with the reenforcing yarn for three courses, and then upon the fourth course and for the next two following courses supply said reenforcing yarn to an additional needle, and repeat such operation, or I may supply the reenforcing yarn to the minimum number of needles for four successive courses and then to an additional needle at the sloping edge for the next four courses and so on throughout repeated cycles. I have, however, in Fig. 4, shown successive sets of three courses each at a, b, c.

After the stocking, which is indicated at 46ª in Fig. 1, has been completed, I cut out all the float threads at a proper distance from the terminal loops of the reenforcing areas in each partial course in such manner as to prevent unravelling. In view of the fact that in accordance with my invention there is a very accurate determination as to the exact wales along which the terminal loops of the reenforcing yarn exists, there is a lessened tendency of the severed ends of the float thread to pull through the terminal loops and to unravel, and I am enabled therefore to sever the float threads close to the terminal loops without danger of unravelling.

Figure 18:
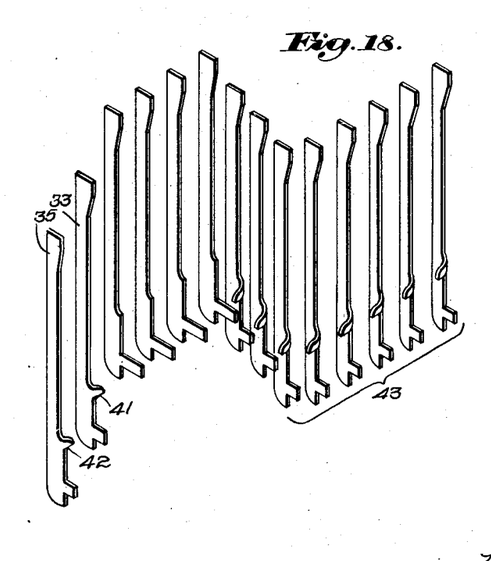
Figs. 18 and 19 are similar views of the interengaging jacks used in making the shape of reenforcement shown in Fig. 3.

I have described in detail the arrangement of interengaging jacks employed in making the M shaped reenforcement with vertical or non-sloping outer lines or legs as indicated in Fig. 2. In making the double reenforcement of the shape shown in Fig. 3, wherein the outer lines or limbs of the M slope as indicated at $C^2$, $D^2$, I use the arrangement of interengaging jacks shown in Figs. 18 and 19. Such arrangement differs from that shown in Figs. 16 and 17 only in that the jacks 33, 35 are provided with the lateral formations 41, 42 respectively, so that the number of needles which take the yarn may be increased in succeeding courses or in other courses as desired.

In Figs. 16 and 17, I have represented a group of jacks 43 all having their nibs 44 turned to the left viewing said figures, and in Fig. 17 I have represented a group of jacks 45 having their nibs 46 turned to the right, viewing said figure. The number of said jacks depends upon the exact size of the M or double pointed reenforcement, and the space at 47 merely indicates that the necessary number of jacks will be provided, the form of M or double pointed reenforcement in the case of Fig. 17 being one in which the outer limbs or lines of the M are vertical.

Figure 19:
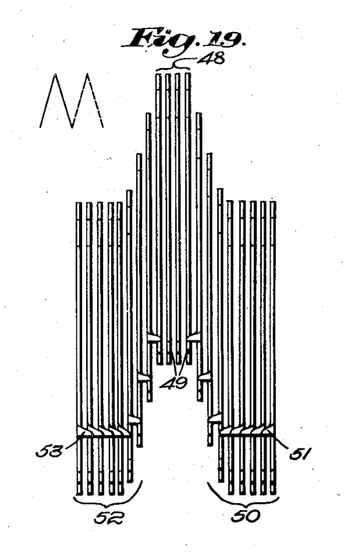

In Fig. 19, however, are shown some of the jacks which would be employed in making an M or double pointed reenforcement wherein the outer limbs or lines of the M are inclined outward and downward, as indicated in Figs. 3 and 5. I have not attempted in Fig. 19 to show all the jacks necessary to make the M or double point of the form just referred to and in fact I have, in said figure, indicated only some of those jacks which are employed to make one half of the M of that shape, it being understood that the other half or point of the M is made by a similar arrangement of jacks constituting a part of the entire series, either to the left or to the right of those shown in Fig. 19. In said Fig. 19, the four central or most highly elevated jacks 48 are provided with butts 49 at their lower ends, but are devoid of lateral nibs, and to the right and left of said four jacks there are respectively provided the jacks 50 having the nibs 51 extending to the left and the jacks 52 having the nibs 53 extending to the right.

Figures 8, 9:
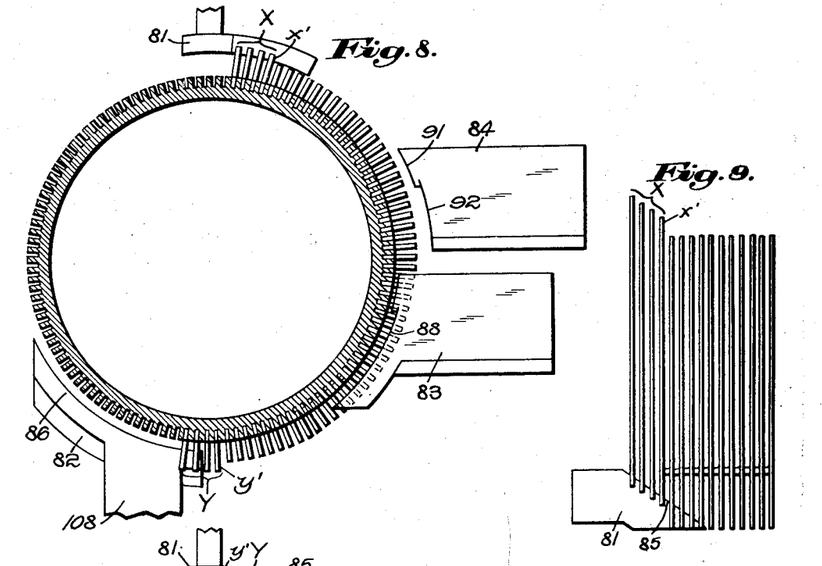
Figs. 8 to 15 are views in horizontal section and in side elevation representing successive positions of the parts including cams and jacks in commencing the knitting of the shape of reenforcement shown in Figs. 2 and 4.

In order to control the manipulation of the jacks whereby the preparatory movement is imparted thereto for presenting a varying number of needles to the reenforcing yarn guide 17, and referring to Figs. 8 to 15, I provide four jack controlling cams 81, 82, 83, 84, adapted to be moved by means sufficiently shown in Fig. 7. At or just prior to the commencement of the first course of the first cycle of courses in the reenforcement, the said cams 81, 82, 83, 84 are moved into the position shown in Fig. 8. Assuming the needle cylinder to be turned in the usual direction for rotary knitting, namely, in a contraclockwise direction, each of the two sets of four jacks with long butts, generally indicated at X and Y, ride up at the proper time the inclined edge 85 of the cam 81, as indicated in Fig. 9, and in so doing, because of the interengaging formations hereinbefore described, only the innermost jack of each group, X, Y (namely, $x'$, $y'$) will commence to elevate a needle next thereto, namely to the right viewing Fig. 8.

Figures 10, 11:
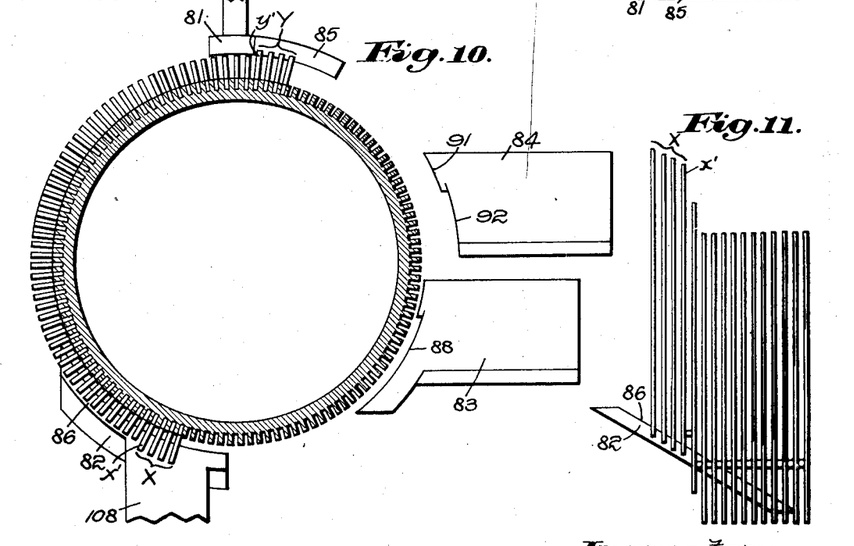
Figure 12:
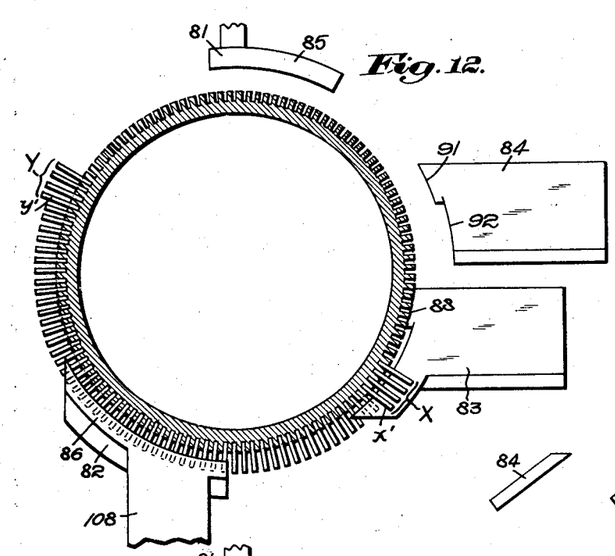
Figure 13:
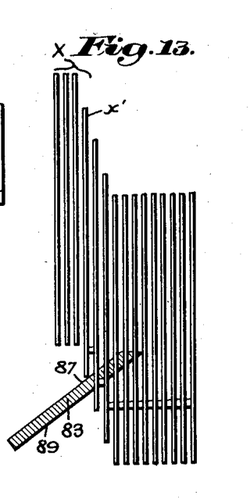
Figure 14:
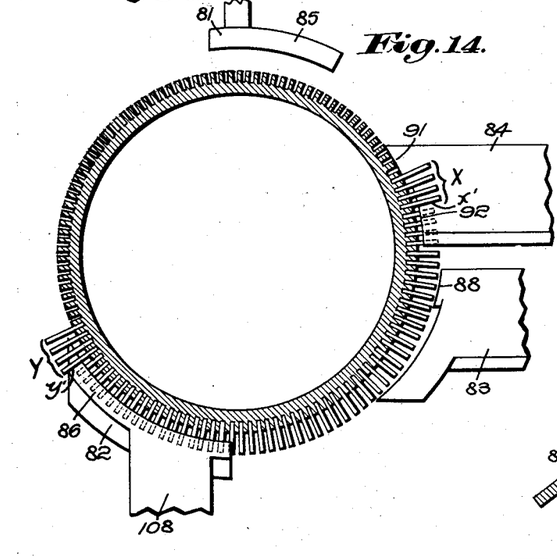
Figure 15:
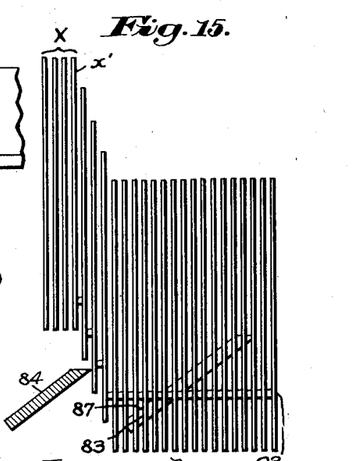

Only the long butt jacks X, Y ride up the edge 85 of the cam 81 at this time; all the short butt jacks ride inside of said cams, as indicated in part in Fig. 8. The said two sets of four long butt jacks, in the continued movement of the needle cylinder, next ride up the inclined surface 86 of the cam 82 as indicated in Figs. 10 and 11, and in so doing the innermost of each set of four jacks carries another jack (namely, the one next thereto at the inside) because of the interengaging formations.

It is unnecessary to describe in utmost detail the precise movements of adjacent jacks in each of the cycles of movement, it being sufficient for the purpose to state that beginning with the two sets of four jacks X, Y, when making the form of M with vertical outer lines or limbs, the jacks between said two sets X, Y are successively lifted to receive the reenforcing yarn at the yarn guide 17, and this operation continues until the two inner tapering sides of the M meet at the base of the reenforcement.

The function of the cam 81 is initially to act upon the two groups of four long butt jacks X, Y. Assuming for simplicity of description that an additional needle with its jack are to be moved up after each fourth course, at the commencement of the fourth course the cam 83 is moved outward into the inactive position represented in Fig. 14, and the cam 84 is moved into active position as indicated in said figure.

Therefore upon this course the cam 84 whose inner end 91 is partially cut away, as indicated at 92, will engage the butts which are at the level indicated by the numeral 93 in Fig. 16 (the cam 83 which is there shown in outline being out and the cam 84 shown in hatched lines being in) and draw them all down to the lowermost level, and they in so doing will draw down all the others proportionately.

I will now briefly describe the means for operating the four jack cams 81, 82, 83, 84.

Each of said cams is desirably controlled from the main pattern drum. The cams 81, 82, being the first and second of the jack controlling cams and which are herein respectively located the back and front of the machine, are operated together as follows:

The cam 81 is provided with a stem 94 received in a housing or bracket 95 for sliding movement and at its outer end it is connected by means generally indicated at 96 and including a downwardly extending link and a lever at its lower end, to a suitable cam or cams upon the pattern drum. When the proper cam upon the drum acts upon the controlling lever for the cam 81, it will move the said cam into its innermost or active position, but at other times the said cam 81 will be in its outer or inactive position. The cam 82, which is the second jack controlling cam, is provided with a stem 108 mounted in a bracket 109 for sliding movement and operatively connected with means at its outer end 110 extending downwardly to the pattern drum to be operated by a cam thereon at the proper time.

The third and fourth cams 83, 84 are preferably operated from a cam upon the 104 gear of the Banner machine in a manner not necessary fully to describe.

Said gear which rotates once to every four revolutions of the needle cylinder is provided with a cam of suitable circumferential extent. Said cam acts upon a lever, the upstanding arm of which is indicated at 123 in Fig. 7. Said lever arm is adapted to ride against the inclined end 124 of the arm 125 of a lever 126 pivoted at 127 upon the bed plate and having an arm 128 provided with a slot 129 at its inner end receiving a pin 130 upon the arm 131 of a lever 132 pivoted at 133 upon the housing 134 wherein are received for sliding movement the jack controlling cams 83, 84. The lever arm 31 is itself provided with a slot 135 receiving a pin 136 in the jack controlling cam 84. Said lever 132 has a second arm 137 provided with a slot 138 receiving a pin 139 in the jack controlling cam 83. A coiled or other spring 140 is connected to the lever arm 125 at a fixed point 141 upon the framing and serves to hold the inclined portion 124 of said lever arm against the lever arm 123. The construction and arrangement of parts are such that when the cam 83 is in its inner or active position, the cam 84 is in its outer or inactive position, and vice versa.

Having thus described with sufficient particularity the means for operating the cams 81, 82, 83, 84, it is to be understood that when making the double pointed or M reinforcement having the outer sloping lines or limbs, the construction of cams would be the same, but the arrangement of jacks indicated in Fig. 19 will be employed rather than that indicated in Fig. 17, and in such case the two sets of four or other number of initially acting jacks X, Y, of Fig. 8, will be arranged nearer together, so that as the reenforcing continues the two parts of the end will progress both along inclined diverging lines.

It will be understood from the foregoing description that as originally described in my parent application Serial No. 647,518, the reenforcement instead of being of a triangular form may be in a form having a double point directed upwardly, thus being approximately of the shape of the capital letter M. In such case the reenforcement is commenced at two considerably spaced points representing the tops of the inner or inclined lines of the letter M. The control of the jacks is such that the reenforcement is broadened out at the inner edges only and is continued until said edges meet. In such case the outer edges of the two parts of the area are along parallel lines, though within the scope of the invention those outer lines may diverge from each other. In the construction first referred to the reenforced areas are two triangles each having a vertical side and an inclined side, which inclined sides meet or desirably meet at the bases of said triangles. That is to say, said triangles are desirably right angle triangles and are turned toward each other. The means for effecting both of these shapes of reenforcements has been described in detail.

Having thus described one illustrative embodiment of the invention, it is to be understood that although specific terms are described, they are used in a generic and descriptive sense and not for purposes of limitation, the scope of the invention being set forth in the following claims.

Claims:

1. A circular knitting machine having means to introduce a main yarn and a reenforcing yarn, a circular series of independently movable needles having means to operate the same for the production of non-reenforced circular work, jacks to elevate needles for the production of reenforced work, said jacks having among themselves movements which are permissibly respectively distinct and which movements are distinct from the yarn taking movement of the corresponding needles, and means to control said jacks to cause the presentation to the reenforcing yarn substantially simultaneously of two series of needles, each of which progressively increases substantially equally at both ends of each of said series of needles, thereby to make two reenforced areas each of the shape of an inverted isosceles triangle.

2. A circular knitting machine having means to introduce a main yarn and a reenforcing yarn, a circular series of independently movable needles having means to operate the same for the production of non-reenforced circular work, jacks to elevate needles for the production of reenforced work, said jacks having among themselves movements which are permissibly respectively distinct and which movements are distinct from the yarn taking movements of the corresponding needles, and means to control said jacks to cause the presentation to the reenforcing yarn substantially simultaneously of two series of needles, each of which progressively increases substantially equally at both ends of each of said series of needles, thereby to make two reenforced areas each of the shape of an inverted isosceles triangle, which triangles meet at their bases.

3. A circular knitting machine having means to introduce a main yarn and a reenforcing yarn, a circular series of independently movable needles having means to operate the same for the production of non-reenforced circular work, jacks located in the needle groove to elevate needles for the production of reenforced work, said jacks having among themselves movements which are permissibly respectively distinct and which movements are distinct from the yarn taking movement of the corresponding needles, and means to control said jacks in said needle grooves to cause the presentation to the reenforcing yarn substantially simultaneously of two series of needles, each of which progressively increases substantially equally at both ends of each of said series of needles, thereby to make two reenforced areas each of the shape of an inverted isosceles triangle, which triangles are of substantially equal size.

4. A circular knitting machine having means to introduce a main yarn and a reenforcing yarn, a circular series of independently movable needles having means to operate the same for the production of non-reenforced circular work, jacks to elevate needles for the production of reenforced work, said jacks having among themselves movements which are permissibly respectively distinct and which movements are distinct from the yarn taking movement of the corresponding needles, and means to control said jacks to cause thereby the presentation to the reenforcing yarn, in substantially the same course, of needles spaced apart the distance between two points of a double pointed high splice reenforcement, and thereafter the presentation of increasing numbers of needles to complete a double pointed tapered high splice each of the form of an isosceles triangle.

5. A circular knitting machine having means to introduce a main yarn and a reenforcing yarn, a circular series of independently movable needles having means to operate the same for the production of non-reenforced circular work, jacks to elevate needles for the production of reenforced work, said jacks having among themselves movements which are permissibly respectively distinct and which movements are distinct from the yarn taking movement of the corresponding needles, and means to control said jacks to cause thereby the presentation to the reenforcing yarn, in substantially the same course, of needles spaced apart the distance between two points of a double pointed high splice reenforcement, and thereafter the presentation of increasing numbers of needles to complete a double pointed tapered high splice having the outline of a capital letter M the outer sides of which diverge, whereby each member of the double pointed high splice has the form of an isosceles triangle.

In testimony whereof, I have signed my name to this specification.

FRANK E. JONES.